(12) United States Patent
Theodore, Jr.

(10) Patent No.: US 6,616,144 B2
(45) Date of Patent: Sep. 9, 2003

(54) MECHANICAL SEAL WITH EMBEDDED LUBRICATION

(75) Inventor: Michael G. Theodore, Jr., Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/224,755

(22) Filed: Aug. 21, 2002

(65) Prior Publication Data

US 2002/0190475 A1 Dec. 19, 2002

Related U.S. Application Data

(63) Continuation of application No. 09/748,543, filed on Dec. 26, 2000.

(51) Int. Cl.[7] .............................................. F16J 15/34
(52) U.S. Cl. ........................ 277/358; 277/399; 277/404
(58) Field of Search ........................ 277/399, 401–408, 277/358, 370

(56) References Cited

U.S. PATENT DOCUMENTS

| | | | | |
|---|---|---|---|---|
| 3,792,911 A | * | 2/1974 | Huber et al. ................ 384/127 |
| 3,957,276 A | * | 5/1976 | Wiese ........................ 277/399 |
| 4,205,858 A | * | 6/1980 | Shimazaki et al. ......... 277/407 |
| 4,258,084 A | * | 3/1981 | Hayden, Sr. ................ 427/239 |
| 4,336,944 A | * | 6/1982 | Blair ......................... 277/399 |
| 4,360,321 A | * | 11/1982 | Copp, Jr. et al. ........... 417/269 |
| 4,619,595 A | * | 10/1986 | Amano et al. ............... 418/83 |
| 5,172,918 A | * | 12/1992 | Pecht et al. ................ 277/400 |
| 5,363,821 A | * | 11/1994 | Rao et al. ................ 123/193.2 |
| 6,318,899 B1 | * | 11/2001 | Boyd ......................... 384/492 |

FOREIGN PATENT DOCUMENTS

| | | | |
|---|---|---|---|
| GB | 2034786 A | * | 6/1980 |
| SU | 1525389 A | * | 11/1989 |

\* cited by examiner

Primary Examiner—Anthony Knight
Assistant Examiner—Vishal Patel
(74) Attorney, Agent, or Firm—Scott M. Confer; MacMillan, Sobanski & Todd

(57) ABSTRACT

A mechanical seal for providing a seal around the drive shaft of a variable displacement swash plate type compressor used in an air conditioning system for a vehicle comprising a rotating bearing surface, an associated stationary bearing surface and a lubricant embedded in the stationary bearing surface. During operation of the compressor, the rotating bearing surface is caused to move against the stationary bearing surface causing lubricant to be released between the bearing surfaces, thereby providing efficient lubrication of the bearing surfaces.

11 Claims, 5 Drawing Sheets

MECHANICAL SEAL WITH EMBEDDED LUBRICATION

CROSS-REFERENCE TO RELATED APPLICATION

This application is a continuation of U.S. patent application Ser. No. 09/748,543, filed Dec. 26, 2000, hereby incorporated herein by reference.

FIELD OF THE INVENTION

The present invention relates to a mechanical seal, and more particularly to a mechanical seal disposed between two relatively moving bearing surfaces such as, for example, between a rotating bearing surface and an associated stationary bearing surface for providing a seal around the drive shaft of a variable displacement swash plate type compressor used in an air conditioning system for a vehicle.

BACKGROUND OF THE INVENTION

A mechanical face seal is frequently used in an automotive cooling pump or refrigeration compressor. Generally, such seals include a stationary annular bearing surface integral with the compressor housing and an associated sealing ring disposed on a rotating drive shaft. A means are provided for urging the facing surfaces of the stationary bearing surface and the sealing ring together. The rotating surface of the sealing ring contacts the stationary bearing surface to form a sealing face which is perpendicular to the shaft. The stationary sealing surface is typically formed of cast iron, stainless steel, ceramic, hard chromium-plated steel or hardened bearing steel; and the associated rotating ring is formed of sintered carbon-graphite, resin-bonded carbon-graphite, resin impregnated carbon-graphite or ceramic.

Refrigeration compressors are used to compress refrigerants, such as carbon dioxide, as part of a standard vapor-compression refrigeration cycle. Typically, a gaseous refrigerant is mixed with a liquid lubricating medium, such as oil, before entering the compressor. The oil is employed to lubricate the compressor components, such as bearings and seals, to reduce component wear. Refrigeration compressors typically include a shaft rotatably supported by bearings within a compressor housing. Mechanical seals are typically employed in such refrigeration compressors to inhibit leakage of lubricating oil between the compressor housing and the shaft.

When a mechanical seal is mounted in a conventional variable displacement swash plate type compressor of an air-conditioner for a vehicle in which carbon dioxide refrigerant is used, the operational conditions of the mechanical seal become severe. The pressure within such a compressor is greater than within a compressor using a different refrigerant, resulting in a greater axial sealing force on the mechanical seal. Additionally, conventional lubricating oil is not soluble in carbon dioxide and therefore the lubricating oil cannot be efficiently distributed within the compressor. Such inefficient distribution of lubricating oil can cause the sealing face of the mechanical seal to receive an insufficient amount of lubricating oil. Insufficient lubrication will cause excessive friction in the sealing face, resulting in overheating and failure of the mechanical seal.

The mechanical seals of the prior art rely primarily on the flow of oil mixed with refrigerant gas to effect proper lubrication. Therefore, ineffective lubrication of the sealing face occurs due the lack of consistent flow of refrigerant gas within the compressor.

It would be desirable to produce a mechanical seal wherein a constant supply of lubrication is released into the sealing face to result in improved lubrication of the mechanical seal.

SUMMARY OF THE INVENTION

Consistent and consonant with the present invention, a mechanical seal wherein a constant supply of lubrication is released into the sealing face to result in improved lubrication of the mechanical seal has surprisingly been discovered.

The shaft mounted mechanical seal for two relatively moving bearing surfaces comprises:

a shaft having a stepped outer surface and a radially outwardly extending shoulder formed on the outer surface;

a first bearing surface formed on one of a rotatable annular element and a stationary annular element, the rotatable annular element adapted to rotate with the shaft and the stationary element adapted to militate against rotation with the shaft;

a second bearing surface formed on the other of the rotatable annular element and the stationary annular element, the second bearing surface being in juxtaposed relation to the first bearing surface;

an annular retainer disposed on the outer surface of the shaft and abutting the shoulder of the shaft, the retainer having one section for fixedly retaining the rotatable annular element on the outer surface of the drive shaft;

a spring member disposed between the retainer and the rotatable annular element for urging the rotatable annular element towards the stationary annular element to engage the first bearing surface and the second bearing surface;

a groove formed in at least one of the first bearing surface and the second bearing surface; and a dry lubricant disposed in the groove to provide lubrication between the first bearing surface and the second bearing surface.

BRIEF DESCRIPTION OF THE DRAWINGS

The above, as well as other objects, features, and advantages of the present invention will be understood from the following detailed description of the preferred embodiment of the present invention with reference to the accompanying drawings, in which.

DETAILED DESCRIPTION OF THE PREFERRED EMBODIMENT

Figure 1:
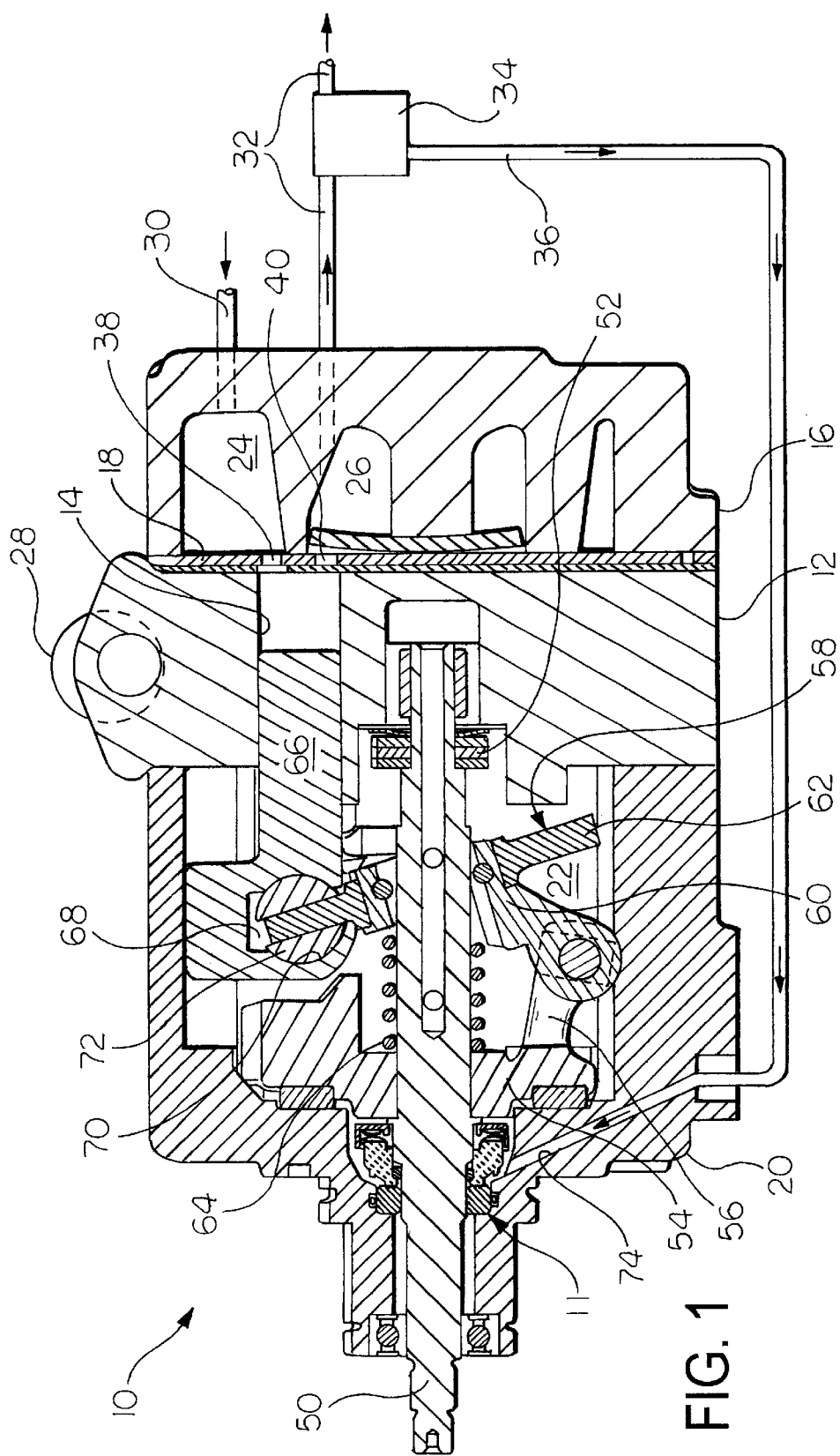
FIG. 1 is a cross sectional elevational view of a variable displacement swash plate type compressor provided with a mechanical seal according to the present invention.
Figure 2:
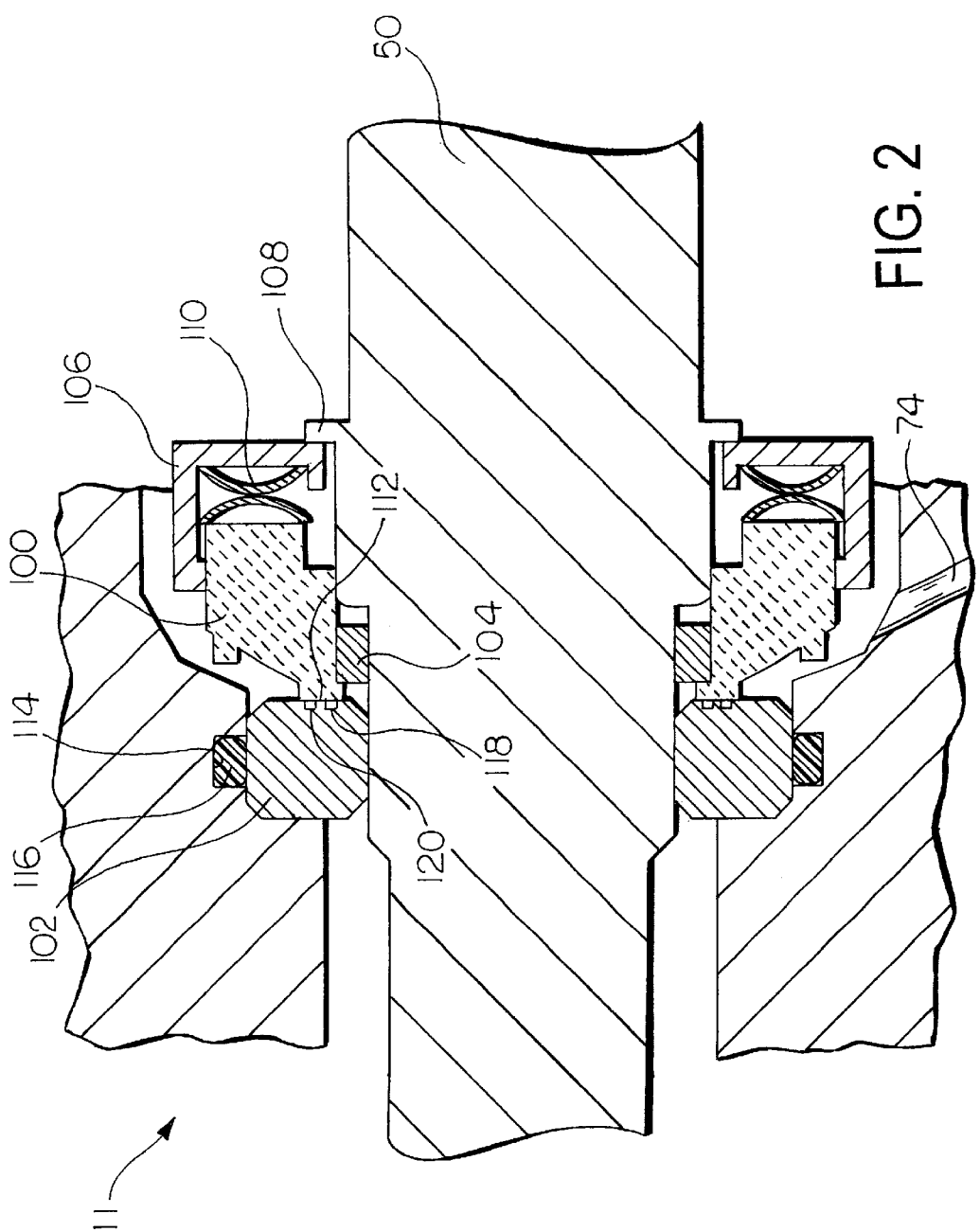
FIG. 2 is a fragmentary enlarged cross sectional view of the compressor illustrated in FIG. 1, showing the features of the mechanical seal.
Figure 3:
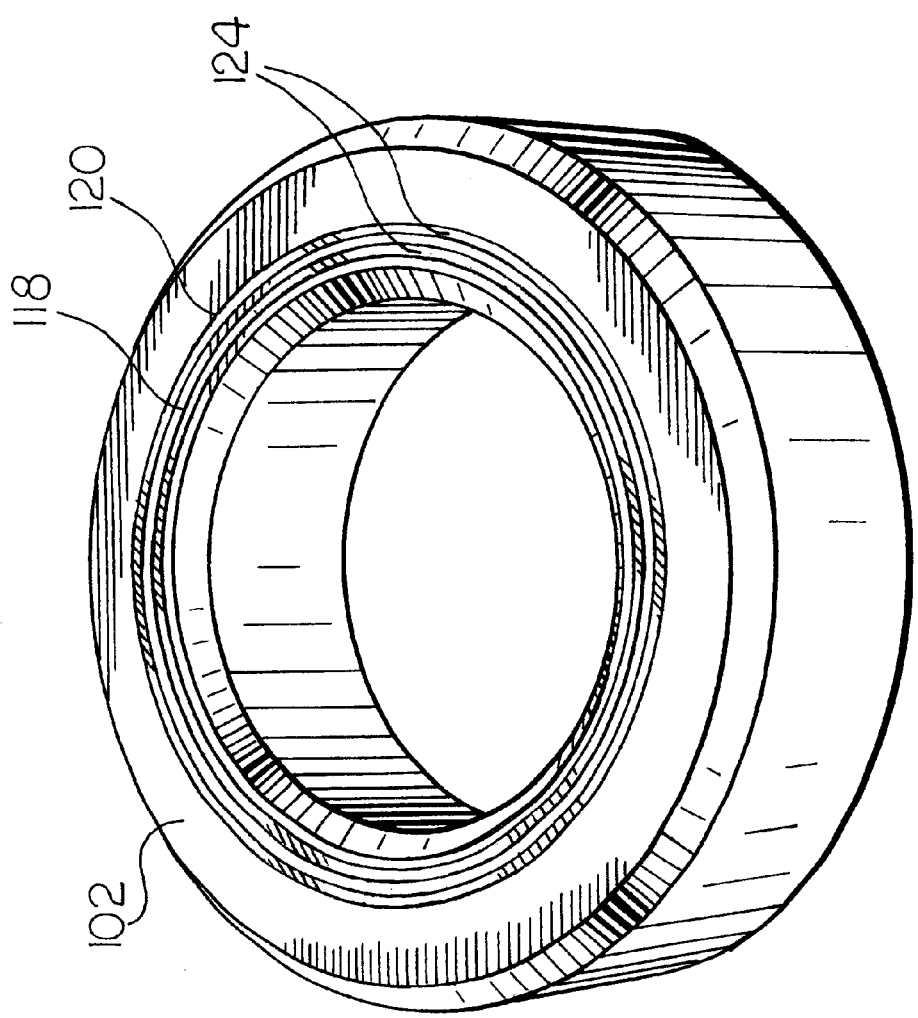
FIG. 3 is a perspective view of a stationary bearing surface of a mechanical seal similar to that illustrated in FIG. 2 incorporating an embodiment of the invention having a plurality of concentric annular grooves containing a lubricant.

Referring now to the drawings, and particularly FIG. 1, there is shown generally at 10 a variable displacement swash plate type compressor mounted with a mechanical seal 11, illustrated in detail in FIG. 2. The compressor 10 includes a cylinder block 12 having a plurality of cylinders 14. A cylinder head 16 is disposed adjacent one end of the cylinder block 12 and sealingly closes the end of the cylinder block 12. A valve plate 18 is disposed between the cylinder block 12 and the cylinder head 16. A crankcase 20 is sealingly disposed at the other end of the cylinder block 12. The crankcase 20 and cylinder block 12 cooperate to form an airtight crank chamber 22.

The cylinder head 16 includes a suction chamber 24 and a discharge chamber 26. A suitable conduit is disposed to provide fluid communication between the crank chamber 22 and the suction chamber 24. An electronic control valve 28 is disposed in the conduit for controlling the flow of refrigerant gas from the crank chamber 22 to the suction chamber 24. The valve 28 can be of any conventional type such as, for example, a ball type valve. The valve 28 is designed to receive an electrical control signal from a remote microprocessor (not shown). The microprocessor monitors the discharge pressure of the compressor, the RPM of the vehicle engine, the cabin temperature and humidity, and the like, to control the valve 28 which, in turn, controls the flow of refrigerant gas from the crank chamber 22 to the suction chamber 24. An inlet port 30 provides fluid communication between an evaporator (not shown) of the cooling portion of an air conditioning system for a vehicle and the suction chamber 24. An outlet conduit 32 provides fluid communication between the discharge chamber 26 and the cooling portion of the air conditioning system for a vehicle. An oil separator 34 is disposed in the conduit 32. An orifice tube 36 provides fluid communication between the oil separator 34 and the crank chamber 22.

Suction ports 38 provide fluid communication between the suction chamber 24 and each cylinder 14. Discharge ports 40 provide fluid communication between each cylinder 14 and the discharge chamber 26.

A drive shaft 50 is centrally disposed in and arranged to extend through the crankcase 20 to the cylinder block 12. One end of the drive shaft 50 is rotatably supported by a suitable bearing mounted in the crankcase 20, and the other end of the drive shaft 50 is rotatably supported in a suitable bearing mounted in the cylinder block 12. Longitudinal movement of the drive shaft 50 is restricted by a thrust bearing 52 mounted in the cylinder block 12.

A rotor 54 is fixedly mounted on the drive shaft 50 adjacent one end of the crankcase 20 within the crank chamber 22. An arm 56 extends outwardly from a surface of the rotor 54 opposite the surface of the rotor 54 that is adjacent the end of the crankcase 20.

A swash plate 58 is formed to include a hub 60 and an annular plate 62. The arm 56 is hingedly connected to the hub 60.

The hub 60 is press fit in a suitable central aperture of the annular plate 62. In the assembled form, the drive shaft 50 is adapted to extend through the central aperture of the hub 60.

A helical compression spring 64 is disposed to extend around the outer surface of the drive shaft 50. One end of the spring 64 abuts the rotor 54, while the opposite end abuts the hub 60 of the swash plate 58. The spring 64 tends to urge the swash plate 58 away from the rotor 54.

A piston 66 is slidably disposed in each of the cylinders 14 in the cylinder block 12. Each piston 66 includes an interior space 68 for receiving the annular plate 62. Spaced apart concave pockets 70 are formed in the interior space 68 of the piston 66 for rotatably containing a pair of semi-spherical shoes 72. The spherical surfaces of the shoes 72 are disposed in the shoe pockets 70 with a flat bearing surface disposed opposite the spherical surface for slidable engagement with the opposing sides of the annular plate 62.

In operation, the compressor 10 is actuated by the rotation of the drive shaft 50 which is typically an associated internal combustion engine of a vehicle. Rotation of the drive shaft 50 causes the simultaneous rotation of the rotor 54. The hub 60 of the swash plate 58 is hingedly connected to the arm 56 of the rotor 54. Rotation of the rotor 54 causes the swash plate 58 to rotate. During rotation, the swash plate 58 is disposed at an inclination. The rotation of the swash plate 58 is effective to reciprocatively drive the pistons 66. The rotation of the swash plate 58 further causes a sliding engagement between the annular plate 62 and the cooperating spaced apart shoes 72.

The reciprocation of the pistons 66 causes refrigerant gas to be introduced from the suction chamber 24 into the respective cylinders 14 of the cylinder head 16. The reciprocating motion of the pistons 66 then compresses the refrigerant gas within each cylinder 14. When the pressure within each cylinder 14 reaches the pressure within the discharge chamber 26, the compressed refrigerant gas is discharged into the discharge chamber 26.

The capacity of the compressor 10 can be changed by changing the inclination of the swash plate 58 and thereby changing the length of the stroke for the pistons 66.

The valve 28 is arranged to monitor the suction and crank chamber pressures of the compressor 10, and control the flow of refrigerant gas from the crank chamber 22 to the suction chamber 24. When an increase in thermal load occurs, the valve 28 is caused to open, thereby causing refrigerant gas to flow through the valve 28 to the suction chamber 24. The pressure differential between the crank chamber 22 and the suction chamber 24 is then equalized. As a result of the decreased back pressure acting on the pistons 66 in the crank chamber 22, the swash plate 58 is moved against the force of the spring 64, the inclination of the swash plate 58 is increased, and as a result, the length of the stroke of each piston 66 is increased.

Conversely, when a decrease in thermal load occurs, the valve 28 is caused to close, thereby reducing the flow of refrigerant gas from the crank chamber 22 to the suction chamber 24. Because the flow of pressurized refrigerant gas to the crank chamber 22 from the discharge 26 is larger than the flow of refrigerant gas from the crank chamber 22 to the suction chamber 24, the back pressure acting on the pistons 66 in the crank chamber 22 is increased. As a result of the increased back pressure in the crank chamber 22, the swash plate 58 yields to the force of the spring 64, the inclination of the swash plate 58 is decreased, and as a result, the length of the stroke of each piston 66 is reduced.

Lubricating oil is introduced into the orifice tube 36 from the oil separator 34, and caused to flow through a passage 74 to the mechanical seal 11, and then into the crank chamber 22.

The mechanical seal 11, shown in detail in FIG. 2, is deemed to be the structure responsible for effecting the desired sealed relationship between the interior of the crankcase 20 and the exterior thereof around the one end of the rotating drive shaft 50. More particularly, the mechanical seal 11 is comprised of two primary elements; namely, an annular element 100 adapted to be rotatable in unison with the drive shaft 50; and an associated stationary annular element 102 mounted on the interior of the crankcase 20.

A sealing collar 104 is fixedly mounted in an appropriate receiving annular groove in the element 100. The collar 104 provides a seal between the element 100 and the outer surface of the drive shaft 50.

The opposite uppermost surface of the element 100 is retained tightly by an annular opening surface of an annular retainer 106 firmly affixed to the drive shaft 50 in any suitable fashion, such as for example, a shaft key arrangement comprising two opposing flat portions formed in the annular opening surface of the annular retainer 106 mated to complementary opposing flat portions formed on the outer surface of the drive shaft 50. The retainer 106 is further disposed against a radially outwardly extending shoulder 108 integral with the drive shaft 50. The shaft key arrangement prevents the retainer 106 from rotating on the drive shaft 50, while allowing movement of the retainer 106 in an axial direction.

The retainer 106 also is adapted to receive and retain an annular set of disk springs 110. The springs 110 effectively urge one facing surface of the element 100 into snug juxtaposed engagement with a cooperating facing surface of the stationary element 102. The facing surfaces of the elements 100 and 102 bear against one another in the region generally indicated by reference numeral 112.

An annular groove 114 is formed within the crankcase 20 and adapted to receive annular elastomeric O-ring 116. The O-ring 116 provides a seal between the element 102 and the crankcase 20.

In operation, the facing surfaces of the relatively movable elements 100 and 102 frictionally engage one another as the drive shaft 50 rotates, and therefore require lubricant to reduce the coefficient of friction and cooperate to effect an acceptable duty cycle. The desired lubrication of the facing surfaces of elements 100 and 102 is provided with a lubricant 124 contained within annular grooves 118 and 120 formed in the facing surface of element 102.

In the preferred embodiment, the grooves 118 and 120 are located as close to the rotation axis as possible so that lubricant 124 will be delivered by centrifugal force to all portions of the facing surfaces of elements 100 and 102.

Figure 4:
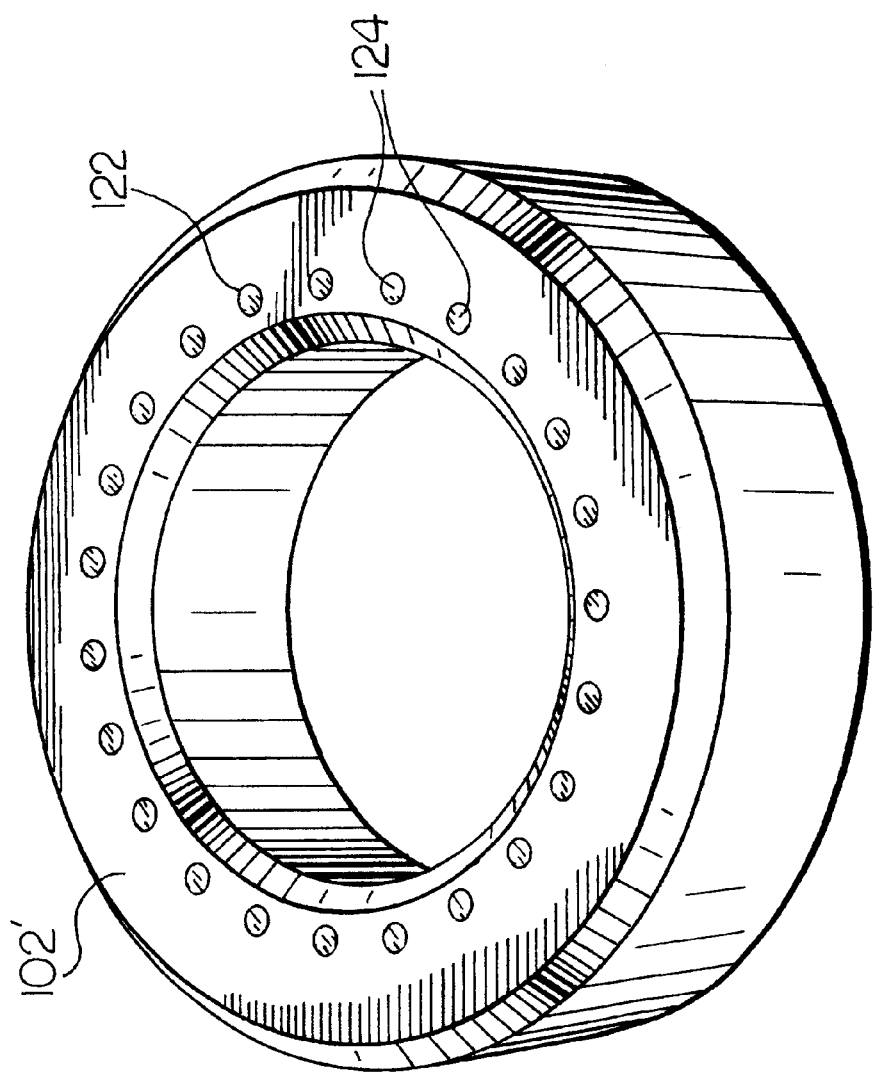
FIG. 4 is a perspective view of a stationary bearing surface of a mechanical seal similar to that illustrated in FIG. 2 incorporating another embodiment of the invention having a plurality of annularly arrayed cylindrical cavities containing a lubricant.

Another embodiment of the stationary element is illustrated in FIG. 4 wherein the element 102' includes a plurality of annularly arrayed cylindrical cavities 122 for containing the lubricant 124.

Figure 5:
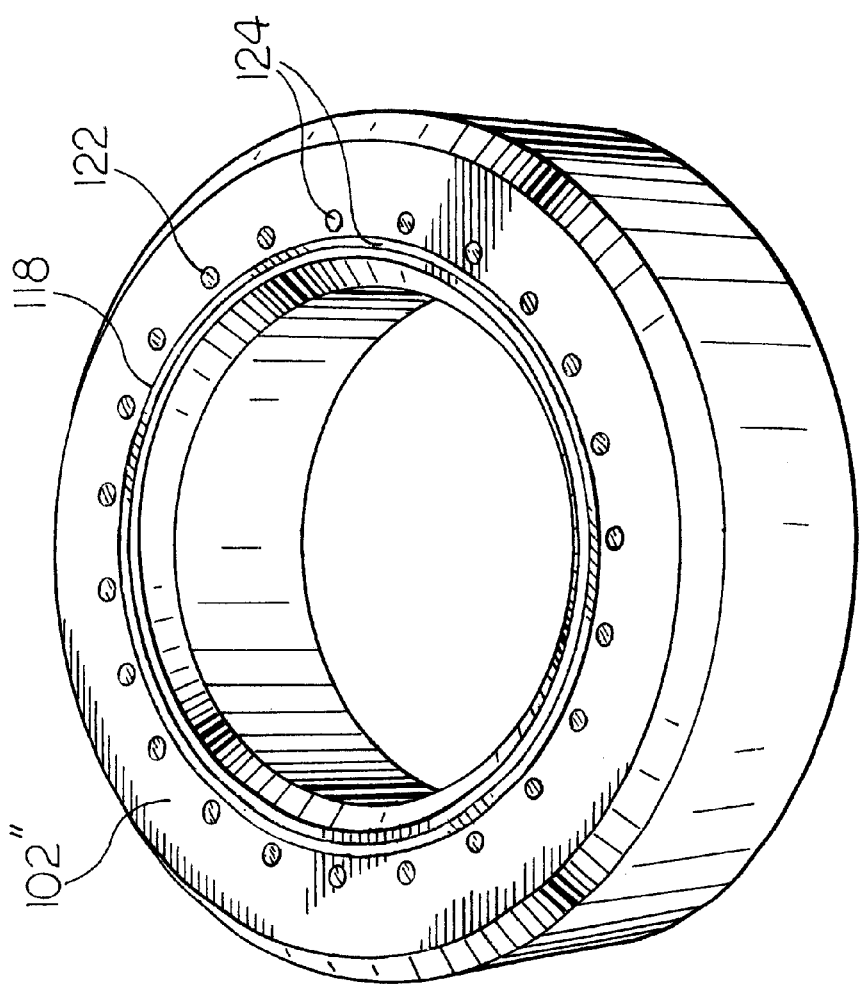
FIG. 5 is a perspective view of a stationary bearing surface of a mechanical seal similar to that illustrated in FIG. 2 incorporating still another embodiment of the invention having one annular cavity and a plurality of annularly arrayed circular cavities containing a lubricant.

Still another embodiment of the stationary element is illustrated in FIG. 5 wherein the element 102" includes one annular groove 118 and a plurality of annularly arrayed cylindrical cavities 122 for containing the lubricant 124. In all other respects, the elements 102' and 102" illustrated in FIGS. 4 and 5 respectively, are the same as that illustrated and described in respect of FIG. 1.

It has been discovered that satisfactory performance of the aforedescribed embodiments of the invention has been achieved by forming the annular element 100 of graphite, forming the stationary annular element 102 of silicon carbide, and utilizing molybdenum disulfide as the lubricant 124. However, it will be understood that satisfactory results can likewise be achieved by other bearing materials and other lubricants.

It will be further understood that satisfactory results can be achieved by incorporating the lubricant, and the grooves and cavities for retaining the lubricant, in the rotating element 100 rather than the stationary element 102.

By introducing a lubricant 124 such as molybdenum disulfide into the region 112 between the facing surfaces of elements 100 and 102, the lubrication of the mechanical seal 11 is maximized. In the preferred embodiment of the invention, molybdenum disulfide is embedded in concentric annular grooves formed in a facing surface of the element 102, causing the molybdenum disulfide to be released into the region 112 during both minimum and maximum operating conditions of the compressor 10, and at times when lubricating oil may be caused to ineffectively flow to the mechanical seal 11. The use of element 102 embedded with concentric annular grooves containing molybdenum disulfide provides adequate and efficient distribution of lubricant into the region 112. The introduction of lubricant into the region 112 thereby improves the durability of the mechanical seal 11.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A shaft mounted mechanical seal for two relatively moving bearing surfaces comprising:

a shaft having a stepped outer surface and a radially outwardly extending shoulder formed on the outer surface;

a first bearing surface formed on one of a rotatable annular element and a stationary annular element, the rotatable annular element adapted to rotate with said shaft and the stationary element adapted to militate against rotation with said shaft;

a second bearing surface formed on the other of the rotatable annular element and the stationary annular element, said second bearing surface being in juxtaposed relation to said first bearing surface;

an annular retainer disposed on the outer surface of said shaft and abutting the shoulder of said shaft, said retainer having one section for fixedly retaining the rotatable annular element on the outer surface of said drive shaft;

a spring member disposed between said retainer and the rotatable annular element for urging the rotatable annular element towards the stationary annular element to engage said first bearing surface and said second bearing surface;

a plurality of spaced apart cavities formed in at least one of said first bearing surface and said second bearing surface;

an annular groove in at least one of said first bearing surface and said second bearing surface; and a dry lubricant disposed in said cavities and said groove to provide lubrication between said first bearing surface and said second bearing surface, wherein said dry lubricant is molybdenum disulfide.

2. The mechanical seal according to claim 1, wherein said first bearing surface is formed of graphite.

3. The mechanical seal according to claim 2, wherein said second bearing surface is formed of silicon carbide.

4. The mechanical seal according to claim 1, including at least one additional groove to receive said lubricant.

5. The mechanical seal according to claim 4, wherein said grooves are concentrically spaced apart.

6. The mechanical seal according to claim 1, wherein said cavities are cylindrical.

7. The mechanical seal according to claim 6, wherein said cavities are arranged to extend in a spaced apart annular array.

8. The mechanical seal according to claim 1, including at least one concentrically disposed annular groove.

9. A variable displacement-swash plate type compressor comprising:
- a cylinder block having a plurality of cylinders arranged radially therein;
- a plurality of pistons, one of said pistons reciprocatively disposed in each of the cylinders of said cylinder block;
- a cylinder head attached to said cylinder block;
- a crankcase attached to said cylinder block to define a crank chamber;
- a drive shaft having an outer surface, said drive shaft rotatably supported by said crankcase and said cylinder block;
- a swash plate adapted to be driven by said drive shaft and adapted to reciprocatively move said pistons, said swash plate having a central aperture for receiving said drive shaft;
- a mechanical seal disposed between said crankcase and said drive shaft, said mechanical seal further comprising:
  - a first bearing surface formed on one of a rotatable annular element and a stationary annular element, the rotatable annular element adapted to rotate with said drive shaft and the stationary element adapted to be received by and held stationary with respect to said drive shaft by said crankcase;
  - a second bearing surface formed on the other of the rotatable annular element and the stationary annular element, said second bearing surface being in juxtaposed relation to said first bearing surface;
  - a plurality of spaced apart cavities formed in at least one of said first bearing surface and said second bearing surface;
  - an annular groove formed in at least one of said first bearing surface and said second bearing surface; and
  - a dry lubricant disposed in said cavities and said groove to provide lubrication between said first bearing surface and said second bearing surface, wherein said dry lubricant is molybdenum disulfide.

10. The compressor according to claim 9, wherein said drive shaft includes a radially outwardly extending shoulder formed on the outer surface.

11. The compressor according to claim 10, further comprising:
- an annular retainer disposed on the outer surface of said drive shaft and abutting the shoulder of said drive shaft, said retainer having one section for fixedly retaining the rotatable annular element on the outer surface of said drive shaft; and a spring member disposed between said retainer and the rotatable annular element for urging the rotatable annular element towards the stationary annular element to engage said first bearing surface and said second bearing surface.

* * * * *